United States Patent [19]

Haak

[11] Patent Number: 5,035,394
[45] Date of Patent: Jul. 30, 1991

[54] ISOLATOR FOR SEISMIC ACTIVITY

[75] Inventor: Wayne R. Haak, Malibu, Calif.

[73] Assignee: The J. Paul Getty Trust, Los Angeles, Calif.

[21] Appl. No.: 593,994

[22] Filed: Oct. 9, 1990

[51] Int. Cl.⁵ .................. F16M 13/00; E04B 1/36; E04H 9/06
[52] U.S. Cl. .................... 298/562; 248/636; 248/638; 248/913; 57/167 R; 57/167 DF
[58] Field of Search .......... 52/167 R, 167 DF; 248/562, 580, 588, 636–638, 913; 384/45

[56] References Cited

U.S. PATENT DOCUMENTS

| 99,973 | 2/1870 | Touaillon . | |
|---|---|---|---|
| 951,028 | 3/1910 | Schar . | |
| 1,651,411 | 12/1927 | Porter . | |
| 1,761,659 | 6/1930 | Cummings . | |
| 2,014,643 | 9/1935 | Bakker . | |
| 3,212,745 | 10/1965 | Lode . | |
| 3,347,002 | 10/1967 | Penkuhn . | |
| 3,771,270 | 11/1973 | Byers . | |
| 3,865,340 | 2/1975 | Ellis . | |
| 3,906,689 | 9/1975 | Nakayama . | |
| 4,113,223 | 9/1978 | Kakizaki | 248/913 X |
| 4,135,598 | 1/1979 | Stafford . | |
| 4,188,681 | 2/1980 | Tada et al. . | |
| 4,209,868 | 7/1980 | Tada et al. . | |
| 4,253,709 | 3/1981 | Teramachi | 384/45 |
| 4,328,648 | 5/1982 | Kalpins . | |
| 4,350,317 | 9/1982 | Aondetto . | |
| 4,371,143 | 2/1983 | Ishida et al. . | |
| 4,402,483 | 9/1983 | Kurabayashi et al. . | |
| 4,408,744 | 10/1983 | Thompson . | |
| 4,496,130 | 1/1985 | Toyama | 248/638 X |
| 4,565,039 | 1/1986 | Oguro et al. . | |
| 4,577,826 | 3/1986 | Bergstrom et al. . | |
| 4,596,373 | 6/1986 | Omi et al. . | |
| 4,617,769 | 10/1986 | Fyfe et al. . | |
| 4,662,133 | 5/1987 | Kondo . | |
| 4,726,161 | 2/1988 | Yaghoubian . | |
| 4,763,869 | 8/1988 | Nakamura et al. . | |
| 4,801,122 | 1/1989 | Stahl . | |
| 4,941,640 | 7/1990 | Nakamura et al. | 52/167 R |

FOREIGN PATENT DOCUMENTS

| 2124986 | 10/1978 | Fed. Rep. of Germany | 248/913 |
|---|---|---|---|
| 639666 | 10/1959 | Italy . | |
| 10139 | 1/1986 | Japan | 248/638 |
| 322073 | 12/1989 | Japan | 52/167 DF |
| 383081 | 8/1990 | Japan | 52/167 R |
| 649906 | 2/1979 | U.S.S.R. . | |
| 1193245 | 11/1985 | U.S.S.R. . | |

Primary Examiner—Richard E. Chilcot, Jr.
Assistant Examiner—Deborah McGann Ripley
Attorney, Agent, or Firm—Harris, Kern, Wallen & Tinsley

[57] ABSTRACT

An isolator for seismic activity including an upper level for supporting an object to be protected, an intermediate level, and a lower level for attachment to the floor or other structure. An interconnection is provided between the upper and intermediate levels to permit relative movement between the levels along a first axis, and a similar interconnetion is provided between the intermediate and lower levels to permit relative between along a second axis perpendicular to the first axis. Each of the interconnections includes one or more bars mounted on one of the levels and defining guide faces oblique to the axis of movement, and a lever pivotally mounted on the other of the levels with a roller for engaging the guide faces, with a spring biasing the roller toward the guide faces. The interconnection also includes tracks and bearings riding on the tracks to provide the interface movement between the levels.

13 Claims, 6 Drawing Sheets

ISOLATOR FOR SEISMIC ACTIVITY

BACKGROUND OF THE INVENTION

This invention relates to protection from shock and vibration, and in particular, to apparatus for protection of objects from damage resulting from seismic activity such as earthquakes. The invention is of particular significance to the protection of large art objects and antiquities of museum quality.

A variety of configurations have been utilized in the past for protection from damage due to earthquake. In one approach the structure is designed to be exceedingly strong so that the structure and its support, such as a single object or entire building, moves with the earth movement without damage. Another approach has been to support the object on some type of apparatus so that the object remains essentially fixed while the earth moves, with the object ultimately being restored to its original relationship with the earth. Structures of this nature are shown in U.S. Pat. Nos. 4,496,130; 4,596,373; and 4,801,122; and in Italian patent 639,666. A variation utilizing cables and springs for controlling motion is shown in U.S. Pat. Nos. 4,371,143; 4,402,483; 4,565,039; 4,577,826; 4,617,769; and 4,662,133.

While these prior designs have been satisfactory for some situations, problems are encountered in other arrangements and installations, and it is an object of the present invention to provide a new and improved isolator construction.

In the case of art objects and antiquities many times they are inherently weak or have been weakened over time and often are unstable.

One of the advantages of the isolator of the present invention is the ability to tune the return mechanism so that the natural frequency of the system can be adjusted for each particular object or circumstance. Long period motions may be attenuated by the very large displacement capacity and in addition, vertical accelerations may be controlled with the rigid locking to eliminate chatter. Other advantages include a lower profile and very little maintenance required.

SUMMARY OF THE INVENTION

An isolator for seismic activity including a plurality of levels with interengaging means providing for relative movement between levels. In the preferred embodiment, three levels are utilized to provide movement between the upper and lower levels along two perpendicular axes. The interengaging means between levels includes a lever pivotally mounted on one of the levels with a roller member for engaging one or more guide faces carried on the other level, with the guide faces oblique to the axis of motion. A spring provides a bias force urging the roller against the guide face with this engagement providing a restoring force which tends to maintain one level in a centered position relative to the other level. Bearings carried on one level ride on tracks carried on the other level, with the bearing-track engagement providing the load carrying capability and with the roller-guide face engagement providing the centering and restoration forces.

Other objects, advantages, features, and results will more fully appear in the course of the following description.

DESCRIPTION OF THE PREFERRED EMBODIMENTS

Figure 1:
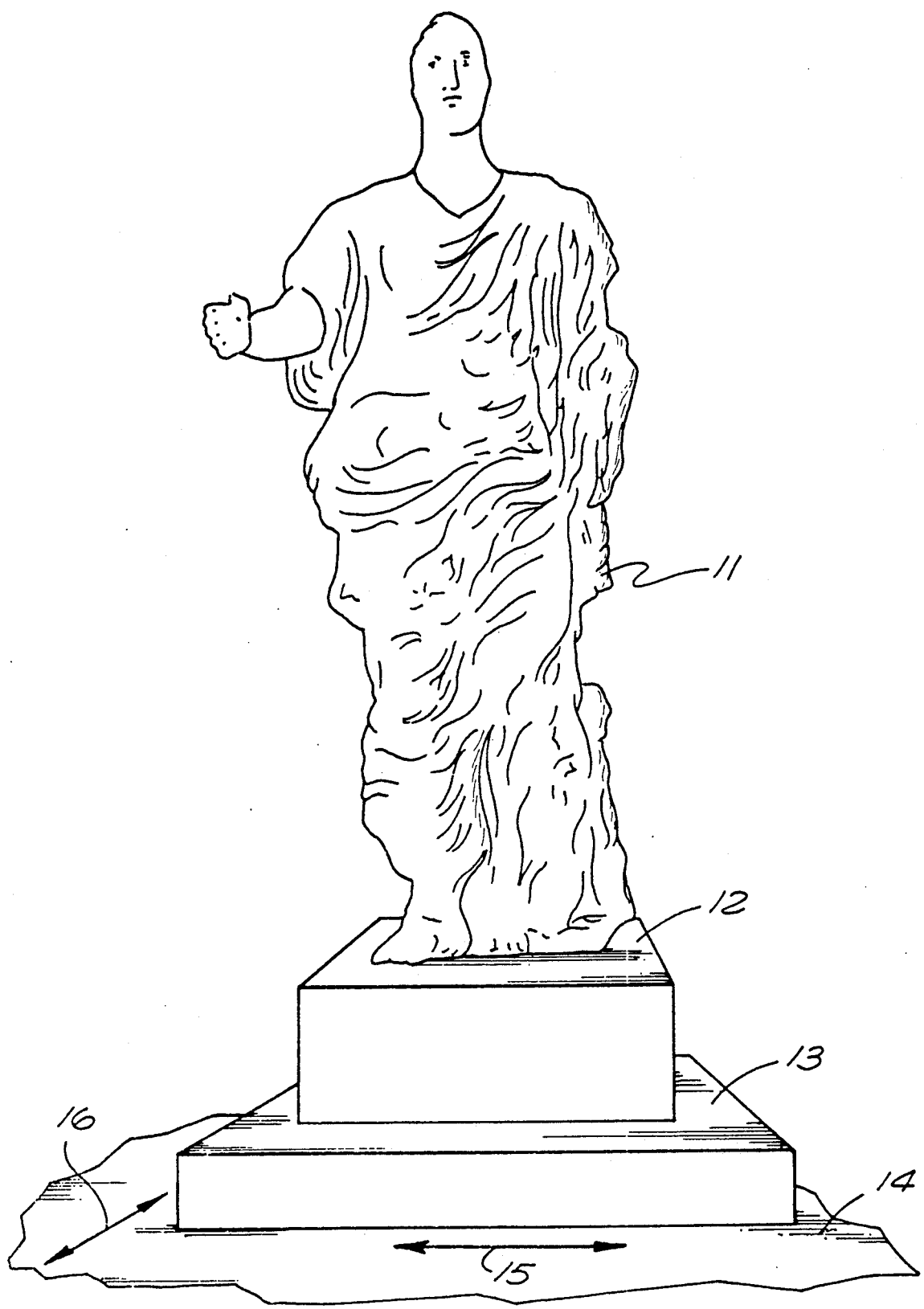
FIG. 1 is a perspective view of a large piece of statuary mounted on a base incorporating the presently preferred embodiment of the isolator of the invention.

In FIG. 1, a statue 11 is mounted on a base 12 which in turn is supported on an isolator covered by a shroud 13, with the isolator resting on a floor 14. A typical statue is greater than life size and may weigh in excess of 1,000 pounds. Toppling of such an item as a result of accident or seismic activity or otherwise, usually results in severe damage to the item, and the isolator of present invention is designed to substantially eliminate the possibility of toppling. Also, the isolator can be used for objects as small as 20 pounds. The isolator provides for movement of the floor relative to the statue along a first axis 15 and along a second axis 16, with the axes being perpendicular to each other so that the isolator functions for relative movement in all directions.

The isolator is shown in detail in FIGS. 2-7 and includes an upper plate 20, an intermediate plate 21, and a lower plate 22. Three rails or tracks 24 are attached to the lower plate 22 by screws 25, and two tracks 24 are attached to the plate 21 by screws. Bearings 26 are attached to the intermediate plate 21 by screws 27 and similar bearings are attached to the upper plate 20 by screws, typically with two bearings for each track.

Figure 8:
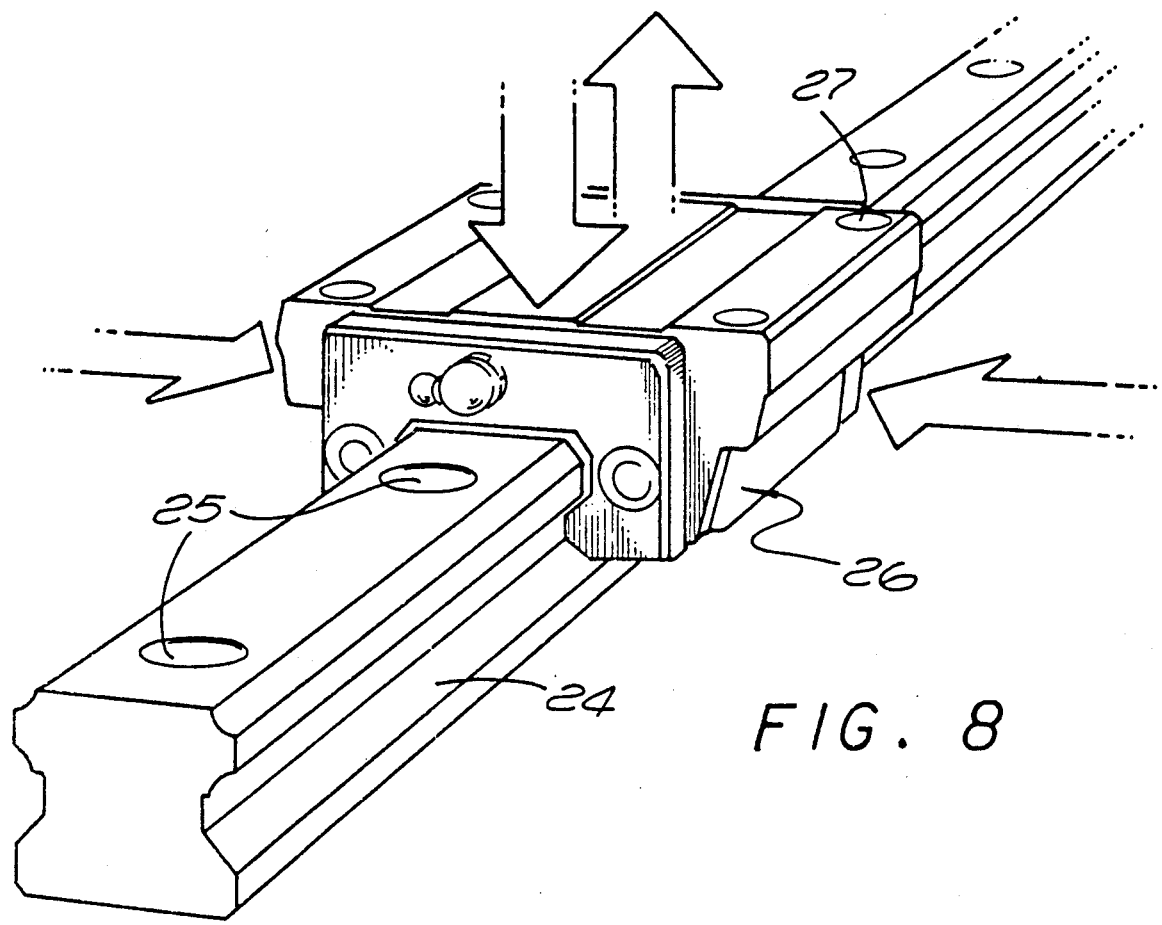
FIG. 8 is an enlarged perspective view illustrating the track and bearing configuration.
Figure 9:
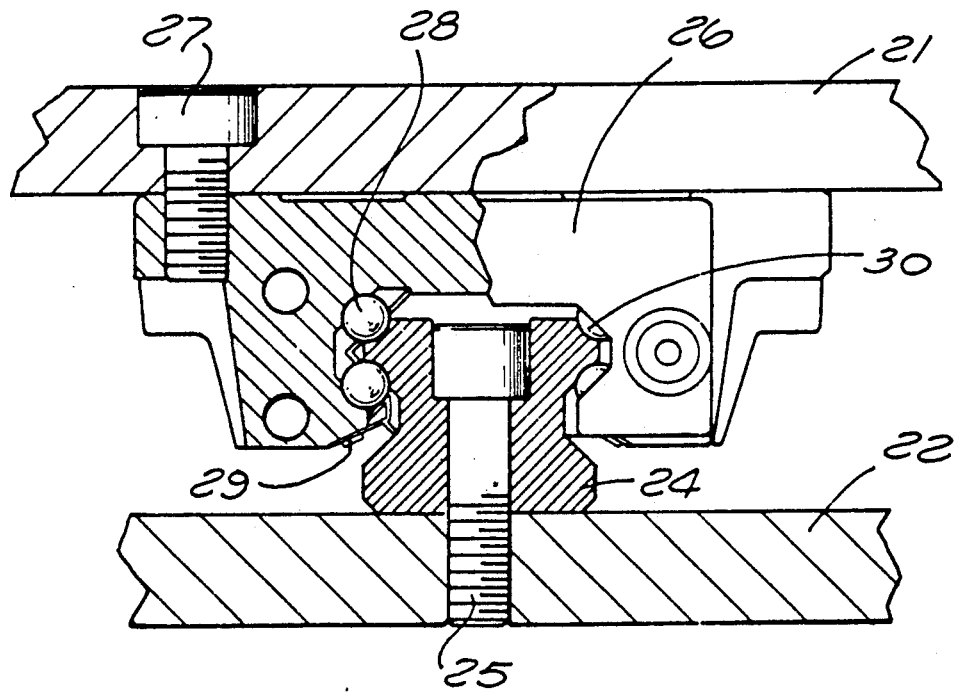
FIG. 9 is a partial sectional view taken through the bearing and track of FIG. 8.

The tracks and bearings may be conventional in design and one suitable source is THK Co., Ltd. LM Guide HSR Type bearings which provide for equal load capacities in four directions, as shown in FIG. 8. In the construction of FIGS. 8 and 9, the bearings 26 ride on the tracks 24 on balls 28 carried in retainers 29 and riding in grooves 30 in the tracks. Details of the particular tracks and bearings are shown in U.S. Pat. No. 4,253,709.

The interengagement of the bearings and tracks provide for movement of the upper plate relative to the intermediate plate along the axis 16 and for movement of the intermediate plate relative to the lower plate along the axis 15. While the presently preferred track and bearing configuration is illustrated, it will be understood that other combinations may be utilized to provide the relative movement of the plates.

Figure 5:
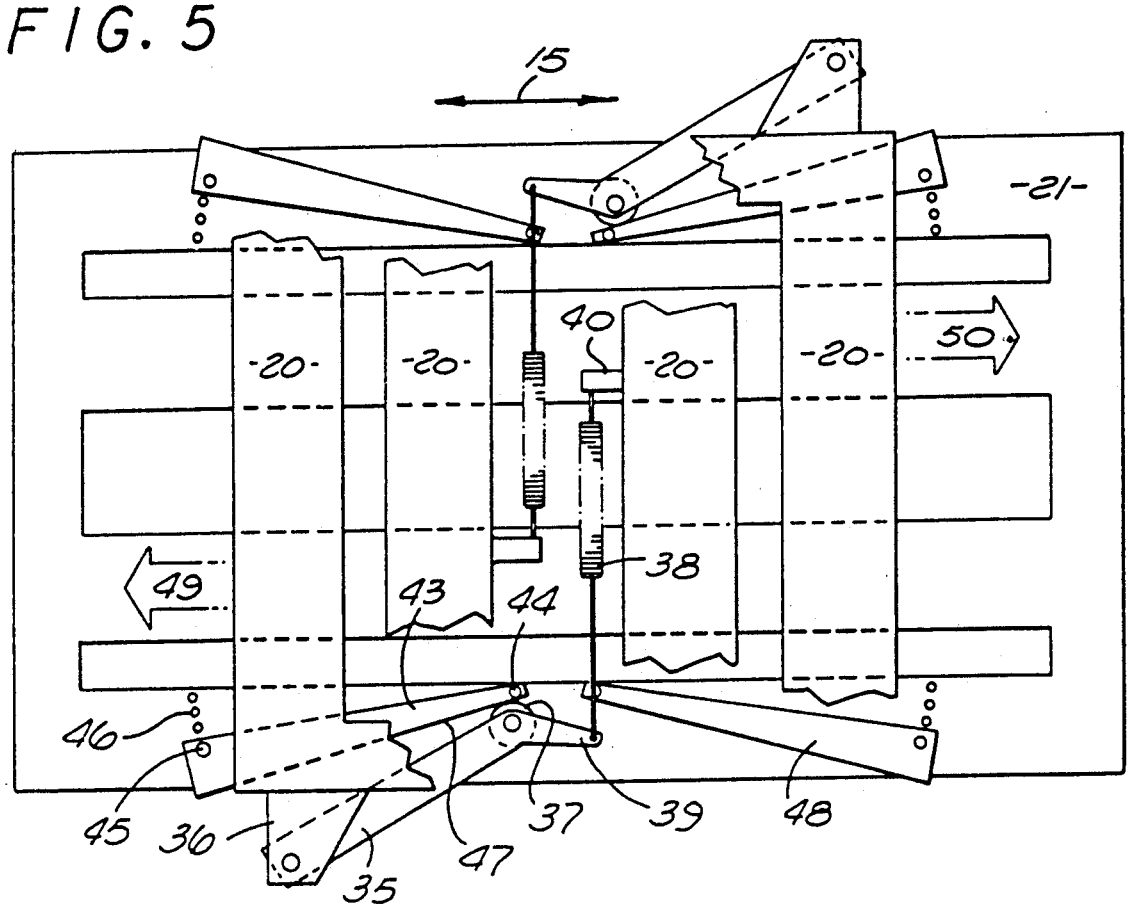
FIG. 5 is a view similar to that of FIG. 3 with some of the components broken away to illustrate the operation of the isolator of the invention.
Figure 6:
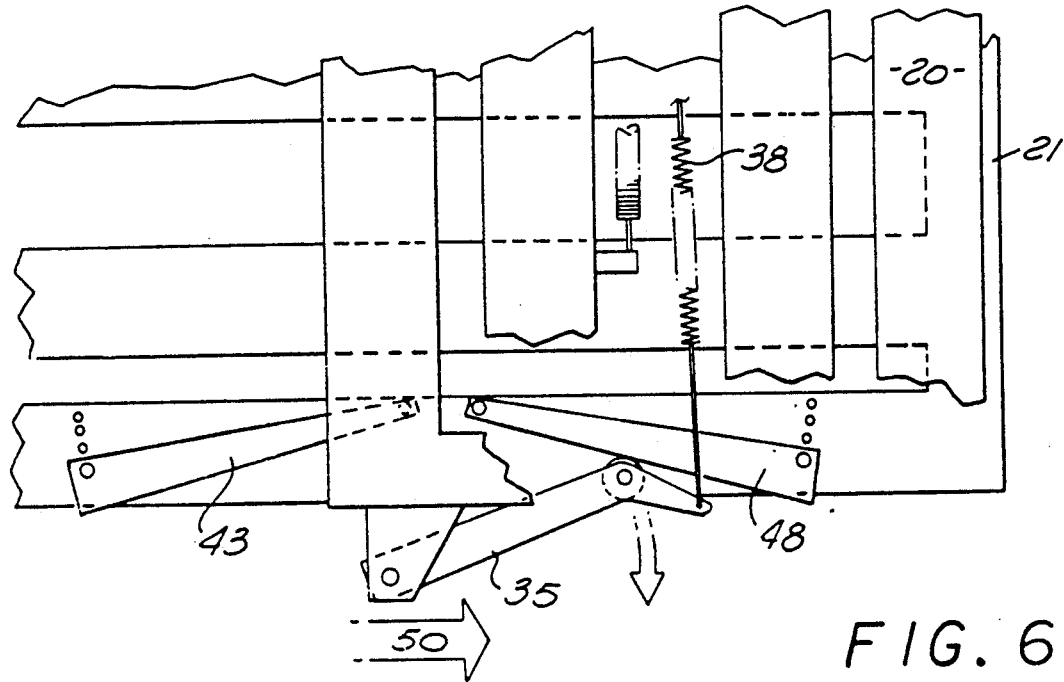
FIG. 6 is a partial view similar to that of FIG. 5 showing the isolator disturbed in a lateral direction.

A centering and restoring mechanism between the upper plate 20 and the intermediate plate 21 is shown in FIG. 5. A lever 35 is pivotally mounted at one end on a bracket 36 of the upper plate 20. A roller 37 is carried on the lever 35 adjacent the other end, with a tension spring 38 connected between an arm 39 of the lever 35 and an arm 40 of the upper plate 20.

A guide bar 43 is pivotally mounted at one end on the intermediate plate 21 by a pin 44. The angular position of the guide bar relative to the intermediate plate is controlled by another pin 45 carried at the other end of the guide bar, which pin can be positioned in any one of a series of holes 46 disposed in an arc on the intermediate plate 21. The guide bar 43 has a guide face 47 disposed at an oblique angle to the axis 15, and the spring 38 urges the roller 37 into contact with the guide face. In the preferred embodiment the guide face 47 is straight, but other shapes can be used as desired.

Movement of the upper plate 20 in the direction of the arrow 49 causes the roller 37 to move to the left along the guide face of the guide bar 43 and extend the spring 38. The spring tends to resist this movement and, when the force causing the movement terminates, the spring causes the roller to move in the opposite direction indicated by the arrow 50 to return the system to the position of FIG. 5. A force producing a movement of the upper plate 20 in the opposite direction as indicated by the arrow 50, causes the roller to move along the oblique face of the guide bar 48, again extending the spring 38. When the force producing the plate movement terminates, the spring moves the upper plate in the opposite direction to restore the mechanism to the position of FIG. 5.

In the preferred embodiment, two such centering and restoring mechanisms are utilized, one at the lower side as previously discussed in FIG. 5, and a similar one at the upper side as shown in FIG. 5. In an alternative and simpler embodiment, only one such centering and restoring mechanism may be utilized. In other alternative embodiments, only one guide bar may be used on each side, and the two guide bars may be produced in a single piece, and the angles of the guide faces may be fixed rather than being adjustable.

Figure 7:
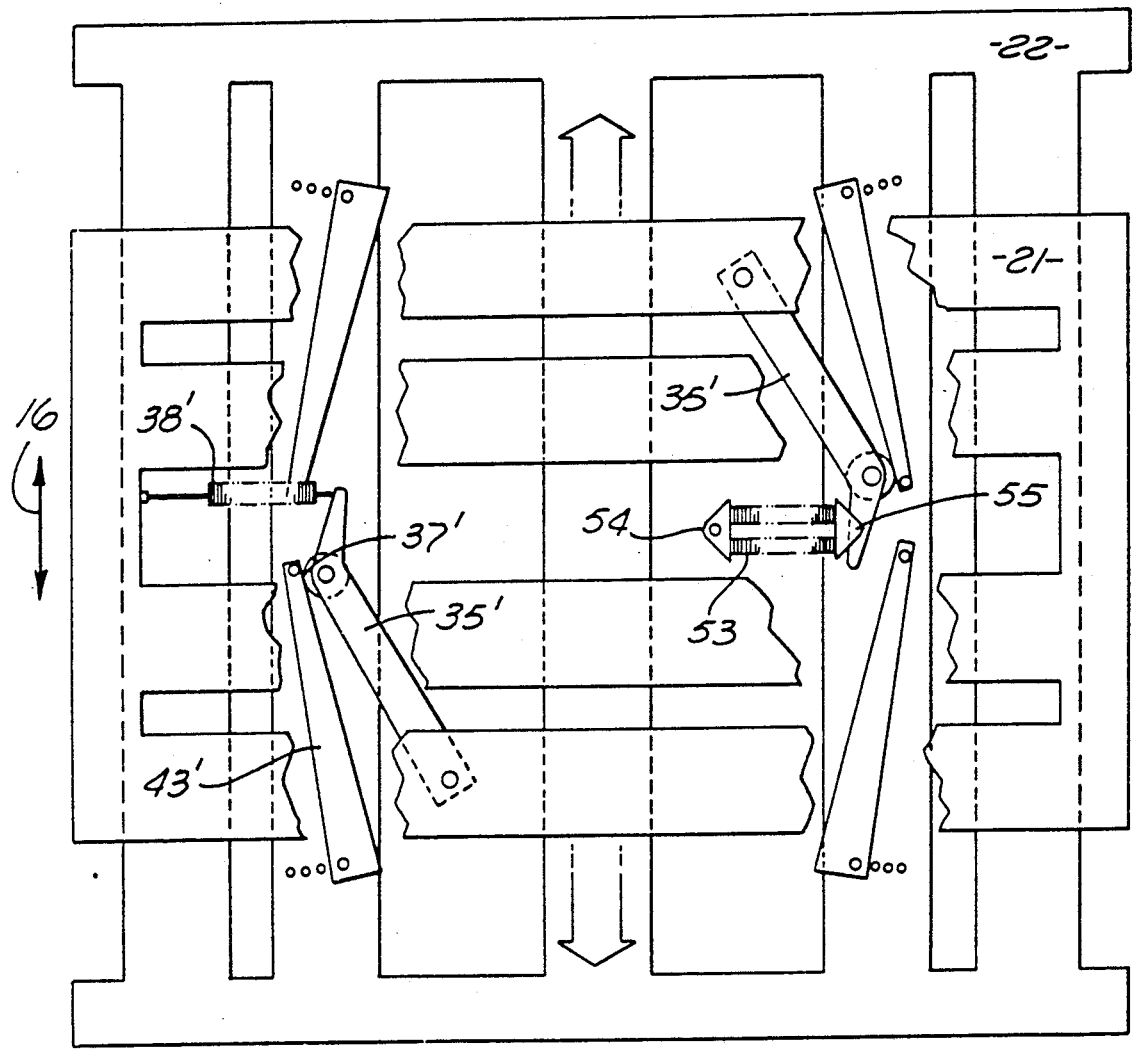
FIG. 7 is a view similar to that of FIG. 5 showing the next layer which provides for motion in a lateral direction perpendicular to that shown in FIGS. 5 and 6.

A similar configuration may be utilized between the intermediate plate 21 and the lower plate 22, as shown in FIG. 7, with lever 35′, roller 37′, spring 38′, and guide bars 43′, 48′. In an alternative configuration, one or more compression springs 53 may be utilized in place of the tension springs 38, 38′. In the embodiment illustrated, two compression springs 53 are positioned between a bracket 54 carried on the lower plate 22 and a similar bracket 55 carried on the lever 35′.

Figure 2:
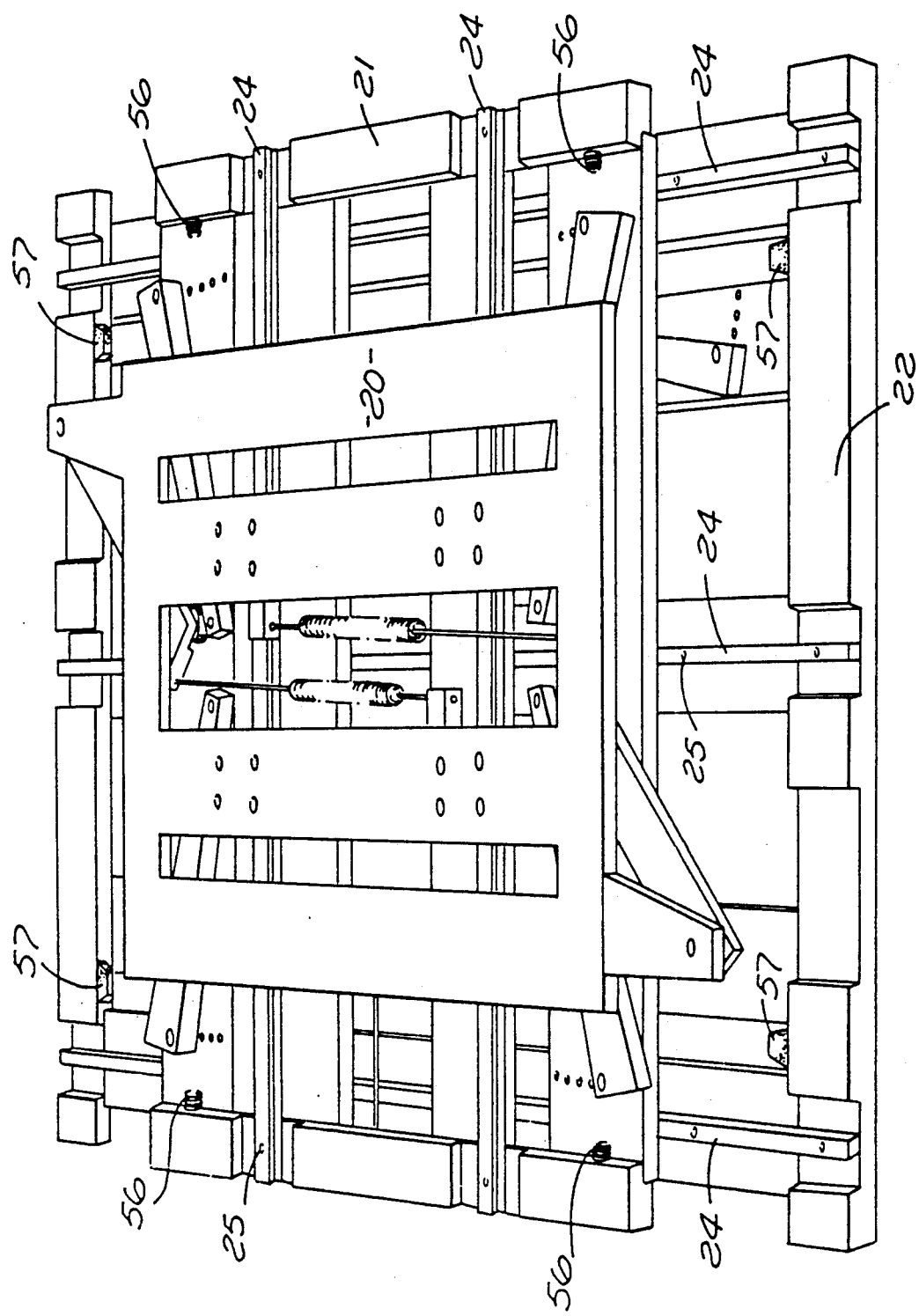
FIG. 2 is a perspective view of the isolator utilized in FIG. 1.
Figure 3:
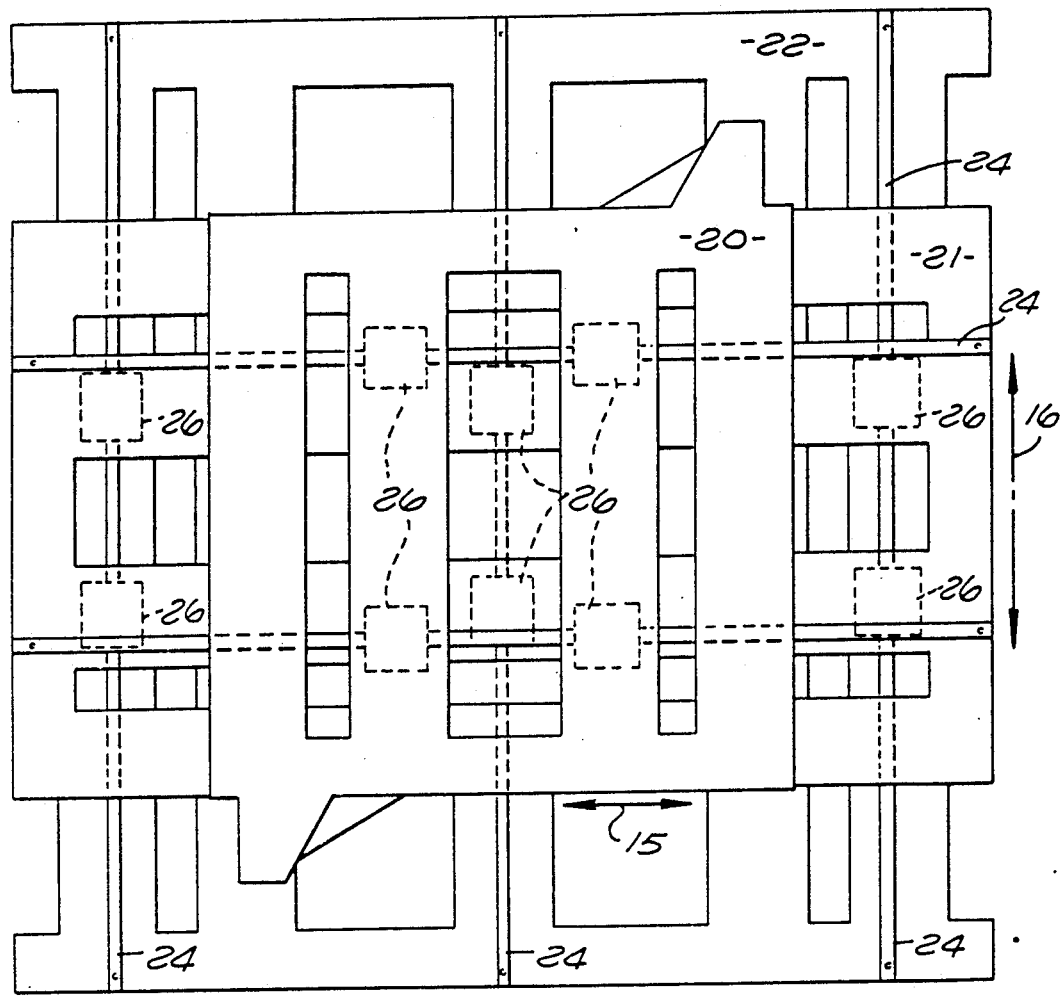
FIG. 3 is a top view of the isolator of FIG. 2.
Figure 4:
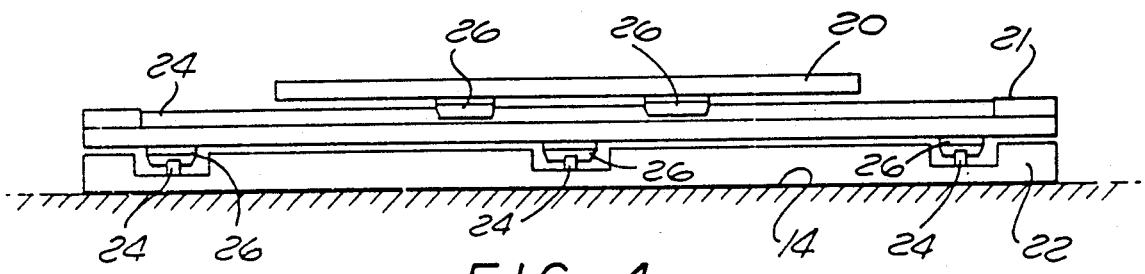
FIG. 4 is a side view of the isolator of FIG. 2.

Snubbers may be utilized at the extremes of motion of the plates. Referring to FIG. 2, spring snubbers 56 are mounted on the intermediate plate 21 for engaging the upper plate 20 at each end of the travel of the upper plate relative to the intermediate plate. Similarly, elastomer snubbers 57 are carried on the lower plate 22 for engaging the intermediate plate 21 at the extremes of relative movement. More than one set of tracks in the same direction may be used to obtain increased displacement while resulting in a smaller package.

I claim:

1. In an isolator for seismic activity, the combination of:

means defining a first level and a second level,
   with said levels including interengaging means for providing relative movement and interconnection between said levels along an axis, said interengaging means including: a centering and restoring means having a lever pivotally attached to one of said levels adjacent one end of said lever and with roller means carried adjacent the other end of said lever;
   guide means attached to the other of said levels and having a guide face oblique to said axis; and
   spring means for urging said lever roller means against said guide face.

2. An apparatus as defined in claim 1 wherein said guide means includes a set of first and second guide bars with guide faces defining paths converging toward an apex,
   with said roller means engageable with each of said guide faces.

3. An apparatus as defined in claim 2 including two of said centering and restoring means with the guide faces of each set of guide bars facing in opposite directions.

4. An apparatus as defined in claim 3 including means for adjusting the angle of the oblique guide faces.

5. An apparatus as defined in claim 3 wherein each of said interengaging means further includes:
   a set of parallel tracks carried on ne of said levels and directed along said axis; and
   a set of bearings carried on the other of said levels, with bearings riding on respective tracks.

6. In an isolator for seismic activity, the combination of:
   means defining an upper level, an intermediate level and a lower level,
   with said upper and intermediate levels including first interengaging means for providing relative movement and interconnection between said upper and intermediate levels along a first axis, and
   with said intermediate and lower levels including second interengaging means for providing relative movement and interconnection between said intermediate and lower levels along a second axis;
   each of said interengaging means including: a centering and restoring means having
   a lever pivotally attached to one of said levels adjacent one end of said lever and with roller means carried adjacent the other end of said lever;
   guide means attached to the other of said levels and having a guide face oblique to said axis; and
   spring means for urging said lever roller means against said guide face.

7. An apparatus as defined in claim 6 wherein said guide means includes a set of first and second guide bars with guide faces defining paths converging toward an apex,
   with said roller means engageable with each of said guide faces.

8. An apparatus as defined in claim 7 including two of said centering and restoring means with the guide faces of each set of guide bars facing in opposite directions.

9. An apparatus as defined in claim 6 including of said centering and restoring means with said guide faces facing in opposite directions.

10. An apparatus as defined in claim 6 including means for adjusting the angle of the oblique guide face.

11. An apparatus as defined in claim 8 wherein each of said interengaging means further includes:
    a set of parallel tracks carried on one of said levels and directed along said axis; and
    a set of bearings carried on the other of said levels, with bearings riding on respective tracks.

12. An apparatus as defined in claim 6 wherein each of said interengaging means further includes:

a set of parallel tracks carried on one of said levels and directed along said axis; and a set of bearings carried on the other of said levels, with bearings riding on respective tracks.

13. In an isolator for seismic activity, the combination of:

means defining an upper level, an intermediate level and a lower level, with said upper and intermediate levels including a first pair of interengaging means for providing relative movement between said upper and intermediate levels along a first axis, and with said intermediate and lower levels including a second pair of interengaging means for providing relative movement between said intermediate and lower levels along a second axis, with said second axis perpendicular to said first axis;

each of said interengaging means including:

a set of parallel tracks carried on one of said levels and directed along said axis; and a set of bearings carried on the other of said levels, with bearings riding on respective tracks; and, a centering and restoring means including:

a lever pivotally attached to one of said levels adjacent one end of said lever and with roller means carried adjacent the other end of said lever;

a set of first and second guide bars attached to the other of said levels and having first and second guide faces, respectively, each oblique to said axis and defining paths converging toward an apex;

spring means for urging said lever roller means against said guide faces, with said roller means engageable with the guide faces;

means for adjusting the angles of the oblique guide faces.

* * * * *